United States Patent
Jiang

(10) Patent No.: US 9,893,753 B2
(45) Date of Patent: Feb. 13, 2018

(54) SIM CARD HOLDER ASSEMBLY WITH A BUTTON STRUCTURE FOR A MOBILE TERMINAL

(71) Applicant: HUIZHOU TCL MOBILE COMMUNICATION CO., LTD., Huizhou (CN)

(72) Inventor: Tao Jiang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 28 days.

(21) Appl. No.: 14/893,725

(22) PCT Filed: May 6, 2015

(86) PCT No.: PCT/CN2015/078403
§ 371 (c)(1),
(2) Date: Nov. 24, 2015

(87) PCT Pub. No.: WO2015/192698
PCT Pub. Date: Dec. 23, 2015

(65) Prior Publication Data
US 2016/0173155 A1    Jun. 16, 2016

(30) Foreign Application Priority Data

Jun. 16, 2014  (CN) .......................... 2014 1 0266594

(51) Int. Cl.
*H04B 1/38* (2015.01)
*H04B 1/3816* (2015.01)
*H04M 1/02* (2006.01)

(52) U.S. Cl.
CPC ........... *H04B 1/3816* (2013.01); *H04M 1/026* (2013.01)

(58) Field of Classification Search
CPC ............................. H04M 1/026; H04B 1/3816
USPC ......................................................... 455/558
See application file for complete search history.

(56) References Cited

U.S. PATENT DOCUMENTS

| 6,222,144 | B1* | 4/2001 | Nishikawa | H01H 21/24 200/16 D |
| 8,767,381 | B2* | 7/2014 | Shukla | G06F 1/1658 361/679.01 |
| 9,106,310 | B2* | 8/2015 | Dondzik | H04B 1/3816 |
| 2011/0255252 | A1* | 10/2011 | Sloey | H04B 1/3816 361/752 |

(Continued)

FOREIGN PATENT DOCUMENTS

| CN | 103248732 A | 8/2013 |
| CN | 103401091 B | 9/2013 |

*Primary Examiner* — William Nealon
(74) *Attorney, Agent, or Firm* — Shimokji IP

(57) ABSTRACT

A mobile terminal may include a SIM card holder having a button structure a tray and a cover. One end of the cover may be rotatably connected to the tray by a rotation shaft structure, and another end of the cover may include a button contact. The mobile terminal design may combine the SIM card holder and the button to reduce one side button part for the mobile terminal, which may allow the mobile terminal to become light and thin, and may save cost. Since one button may be removed from the mobile terminal, the external design of the product may be simplified such that the appearance of the product may be simpler and more beautiful.

18 Claims, 4 Drawing Sheets

(56) References Cited

U.S. PATENT DOCUMENTS

2012/0224330 A1\* 9/2012 Liu .................... G06K 13/0818
　　　　　　　　　　　　　　　　　　　　　361/726
2014/0078660 A1\* 3/2014 Dondzik ............. H04B 1/3888
　　　　　　　　　　　　　　　　　　　　　361/679.31

\* cited by examiner

SIM CARD HOLDER ASSEMBLY WITH A BUTTON STRUCTURE FOR A MOBILE TERMINAL

TECHNICAL FIELD

The present disclosure relates to the field of mobile terminal technologies. In particular, the present disclosure relates to a mobile terminal and a SIM card holder having a button structure.

BACKGROUND

Currently, existing mobile terminal devices, such as smart phones, tablets, etc., often use a subscriber identification module (SIM) card holder to install a SIM card in the mobile terminal, as shown in FIG. 1. FIG. 1 illustrates a structure of a SIM card holder according to the prior art. The SIM card holder 100 is composed of one part, i.e. a tray 110 and a SIM cover 120 that are formed integrally.

The SIM card holder 100 is typically disposed at a side of a mobile terminal, while one or more side buttons, e.g. a power button, are provided on a side of the mobile terminal that is close to the SIM card holder 100. According to the prior art, the SIM card holder and the side buttons are disposed in a mutually independent and separate manner. However, the existing SIM card holder 100 can only achieve a function of inserting and pulling the SIM card. When the tray 110 is inserted into a mobile terminal, the SIM cover 120, exposed outside of the mobile terminal, is unable to move relative to the tray 110, while the side buttons can simply achieve functions of the buttons. With the SIM card holder 100, and the side buttons side by side according to the prior art, there are too many parts that affect an external beauty of an associated mobile terminal, and that are not favorable for development trends of mobile terminals which are becoming lighter, thinner and simpler.

Therefore, the prior art is in need of improvement and development.

SUMMARY

In light of the above drawbacks of the prior art, a mobile terminal and a SIM card holder having a button structure are provided, which improve existing SIM card holders and are favorable for associated mobile terminals to become lighter, thinner and simpler.

A SIM card holder having a button structure includes a tray and a cover, one end of the cover being rotatably connected to the tray by a rotation shaft structure, and another end of the cover is provided with a button contact.

In another embodiment, a SIM card holder having a button structure includes a rotation shaft structure with a rotation shaft fixedly mounted on a tray, and a rotation shaft seat fixedly mounted on a cover, wherein the rotation shaft is assembled onto the rotation shaft seat.

In a further embodiment, a SIM card holder having a button structure includes a V-shaped spring sheet that is provided between a cover and a tray, wherein the V-shaped spring sheet includes an installation portion fixedly installed on an internal side of the cover and a spring portion abutting against an external side of the tray.

In yet another embodiment, a SIM card holder having a button structure includes an external side of a tray that is formed with a first opening groove, a spring portion is disposed inside the first opening groove, and an end of the spring portion abuts against a bottom of the first opening groove.

In yet a further embodiment, a SIM card holder having a button structure includes an end of an installation portion that bends inward to form a limiting hook, a protrusion is formed on a tray, and the protrusion and the limiting hook are locked with each other.

In another embodiment, a SIM card holder having a button structure includes an internal side of a protrusion that is formed with a second opening groove, and a limiting hook that is disposed within the second opening groove.

In a further embodiment, a SIM card holder having a button structure includes an end of an installation portion that forms a guide groove through symmetric guide edges, and a protrusion that is disposed within the guide groove.

In yet another embodiment, a SIM card holder having a button structure includes a width of a guide groove that is equal to a width of a protrusion.

In yet a further embodiment, a mobile terminal includes a mobile terminal body, a button switch inside the mobile terminal body, a SIM card holder having a button structure on the mobile terminal body, and the button switch is in contact connection with a button contact.

In another embodiment, a mobile terminal includes a shell of the mobile terminal body with a through hole for a button contact to run through.

Compared with the prior art, a mobile terminal and a SIM card holder having a button structure is provided. As a design of the present disclosure combines the SIM card holder and the button, the design reduces one side button part for the mobile terminal, which is favorable for the mobile terminal of the present disclosure to be light and thin, and save cost. Since one button is removed, an external design of the product of the present disclosure may be simplified, such that an appearance of the product is simpler and more beautiful.

DETAILED DESCRIPTION

A mobile terminal and a SIM card holder having a button structure is provided. To make objects, technical solutions and effects, specific embodiments are described in detail below with reference to the accompanying drawings. It should be understood that the specific embodiments are for illustrative purposes. The specific embodiments are not intended to limit the scope of the present invention in any way.

Figure 1:
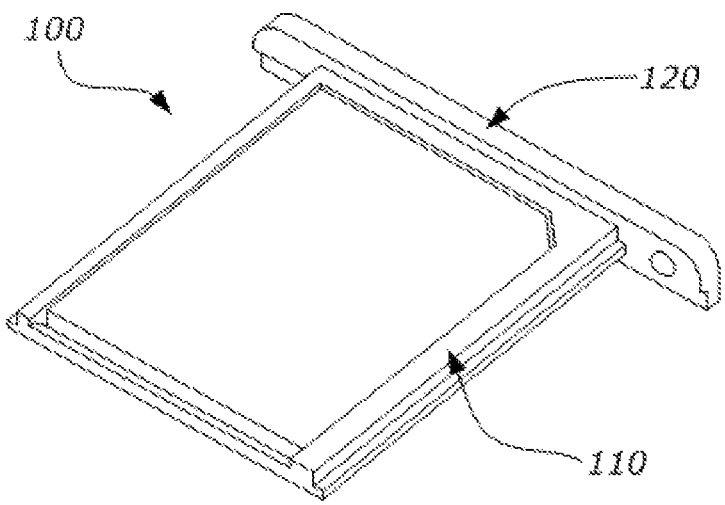
FIG. 1 illustrates a structure of a SIM card holder according to the prior art.
Figure 2:
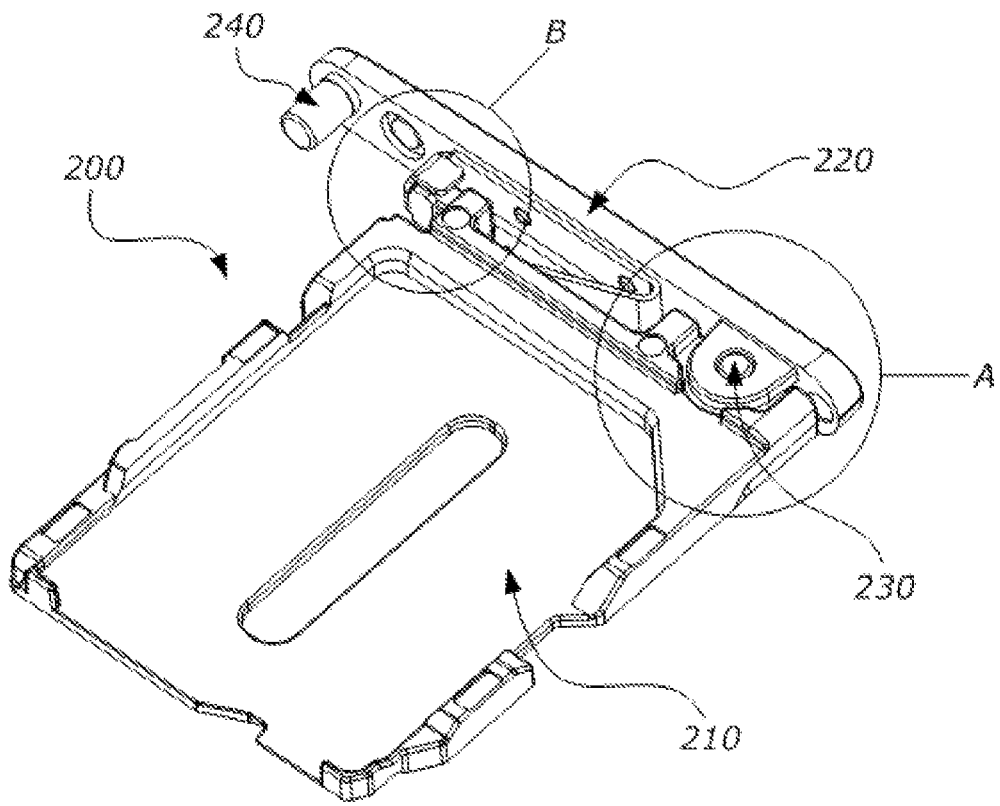
FIG. 2 depicts a 3D view of a SIM card holder having a button structure according to an embodiment of the present invention.

Turning to FIG. 2, a 3D view of a SIM card holder having a button structure 200 may include a tray 210 and a cover 220. One end of the cover 220 may be rotatably connected to the tray 210 by a rotation shaft structure 230. Another end of the cover may include a button contact 240. Unlike existing integrally formed SIM card holders, the tray 210 and the cover 220 in the SIM card holder according to the present disclosure, may make relatively movements, such that the SIM card holder 200 can be used to install a SIM card, and can be used as a side button of a mobile terminal.

A SIM card holder 200 may be disposed inside a back cover of a mobile terminal next to a battery, or the SIM card holder 200 may be disposed on a side of a shell of a mobile terminal (specifically, a total of four sides, i.e. the top, bottom, left and right sides relative to the display, and preferably the right side). Correspondingly, a side button, implemented by the SIM card holder, according to an embodiment of the present invention, may be a power button, a screen switch button, a volume button, etc.

Figure 3:
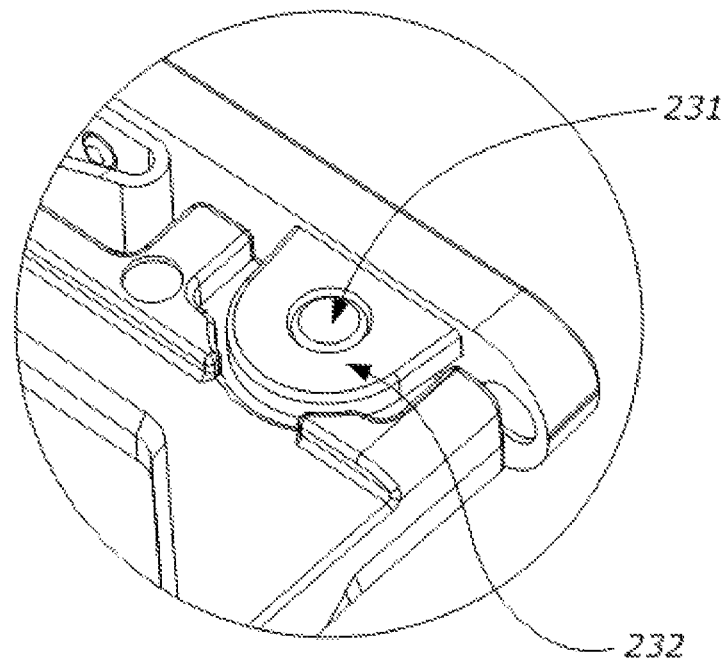
FIG. 3 depicts a partially enlarged view of A in FIG. 2.

With reference to FIG. 3, a partially enlarged view of A in FIG. 2 is depicted. A rotation shaft structure 230 may include a rotation shaft 231 and a rotation shaft seat 232. The rotation shaft 231 may be, for example, fixedly mounted on the tray 210, and the rotation shaft seat 232 may be, for example, fixedly mounted on the cover 220. Accordingly, the rotation shaft 231 may be assembled and connected with the rotation shaft seat such that the cover 220 rotates relative to the tray 210. Alternatively, the rotation shaft 231 may be fixedly mounted on the cover 220 and the rotation shaft seat 232 may be fixedly mounted on the tray 210, i.e., the installation positions of the rotation shaft 231 and the rotation shaft seat 232 may be switched to achieve the same rotation effect.

Figure 5:
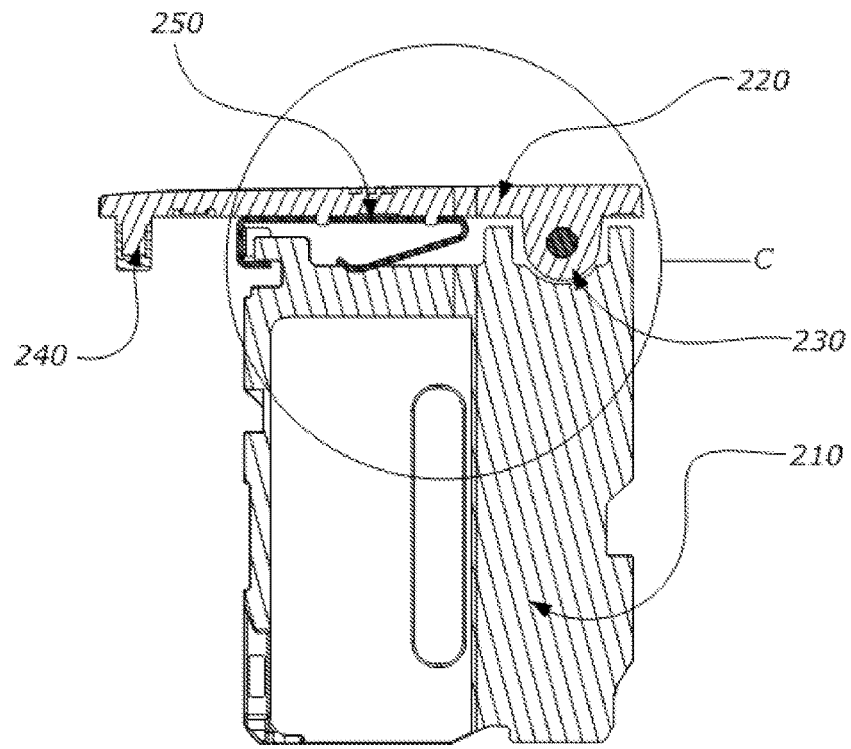
FIG. 5 depicts a cross-sectional view of a SIM card holder having a button structure according to an embodiment of the present invention.

Turning to FIG. 5, a cross-sectional view of a SIM card holder having a button structure may include a V-shaped spring sheet 250 between the cover 220 and the tray 210 so as to reset the cover 220. Currently, all commonly used side buttons for mobile terminals use press-type buttons. By rotating the cover 220, embodiments of the present invention may include a button contact 240 on an end of the cover to press the button switch on the mainboard of the mobile terminal. Thereby, the cover 220 may function as a button. After pressing the button switch once, the cover 220 may be reset through the above V-shaped spring sheet 250.

Figure 6:
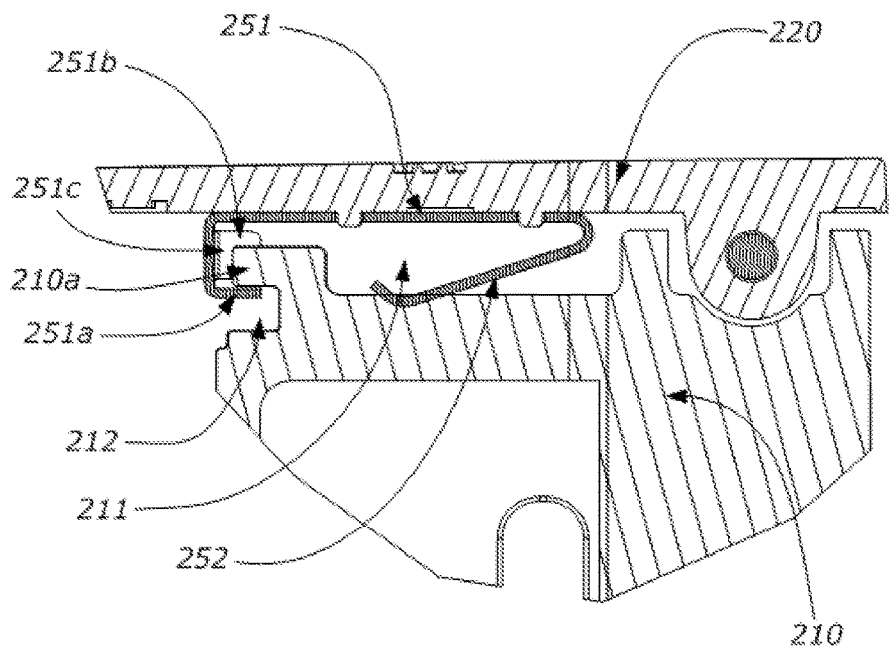
FIG. 6 depicts a partially enlarged view of C in FIG. 5.

With reference to FIG. 6, a partially enlarged view of C in FIG. 5 may include a V-shaped spring sheet 250 having an installation portion 251 and a spring portion 252. The installation portion 251 may be fixedly installed on an internal side of the cover 220 with the spring portion 252 abutting against an external side of the tray 210. After completing a button triggering action, the button contact 240 may reset the cover 220 to an original state through the spring portion 252. Furthermore, the external side of the tray 210 may be formed with a first opening groove 211, the spring portion 252 may be disposed inside the first opening groove 211, and the end of the spring portion 252 may abut against a bottom of the first opening groove 211.

Figure 4:
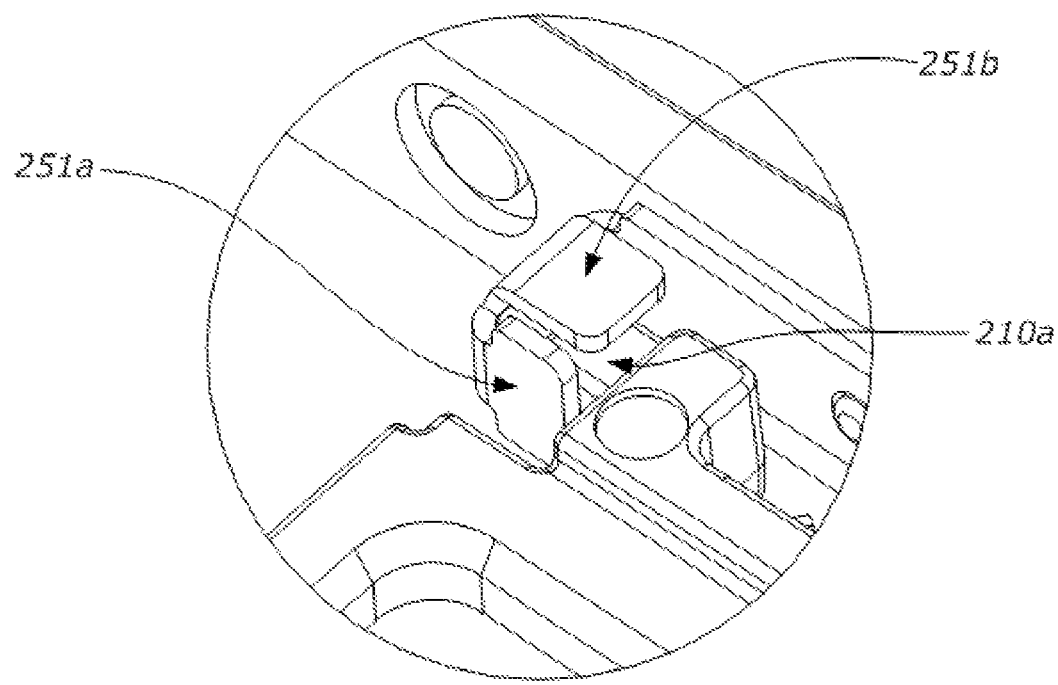
FIG. 4 depicts a partially enlarged view of B in FIG. 2.

Referring to both FIG. 4 and FIG. 6, a partially-enlarged view of B in FIG. 2 may include an end of the installation portion 251 that may bend inward to form a limiting hook 251a. A protrusion 210a may be formed on the tray 210, and the protrusion 210a and the limiting hook 251a may be locked with each other. A rotation range of the cover 220 may be limited through the lock engagement between the limiting hook 251a and the protrusion 210a, so as to prevent the cover 220 from excessive outward extension under an opposite acting force by the V-shaped spring sheet 250. Thereby, an outward extension of the cover 220, beyond the side of the mobile terminal, may be avoided to ensure a levelness of an associated side, and prevent the cover 220 from hanging to or scratching other articles, and prevent damage to the cover 220 as a result of collision. Furthermore, an internal side of a protrusion 210a may be formed with a second opening groove 212, the limiting hook 251a may be disposed within the second opening groove 212, and the limiting hook 251a can move vertically within the second opening groove 212.

When the cover 220 rotates inward to trigger the button, the limiting hook 251a may correspondingly move downward within the second opening groove 212, and when the limiting hook 251a reaches the bottom side of the second opening groove 212, the cover 220 may be stopped form rotating inward. When the cover 220 rotates outward to be reset under an opposite acting force by the V-shaped spring sheet 250, the limiting hook 251a may move upward within the second opening groove 212, and when the limiting hook 251a reaches a top side of the second opening groove 212, the cover 220 may be stopped form rotating outward. In other words, the above engagement between the limiting hook 251a, the protrusion 210a and the second opening groove 212 can impart a two-way limitation on the cover 220.

An end of the installation portion 251 may form a guide groove 251c through symmetric guide edges 251b, and the protrusion 210a may be disposed within the guide groove 251c. A width of the guide groove 251c may be equal to a width of the protrusion 210a, the purpose of which may be that the guide groove 251c can make the cover 220 rotate only in one direction, ensuring rotational stability and preventing the cover from swinging from one side to another during rotation.

The limiting hook 251a and the symmetric guide edges 251b may also have an independent structure, rather than a structure that integrally forms the V-shaped spring sheet 250 with the limiting hook 251a and the symmetric guide edges 251b. Nevertheless, technical advantages of a structure design that includes integral formation may be that some parts can be saved, which may reduce production cost of products to a certain extent.

Figure 7:
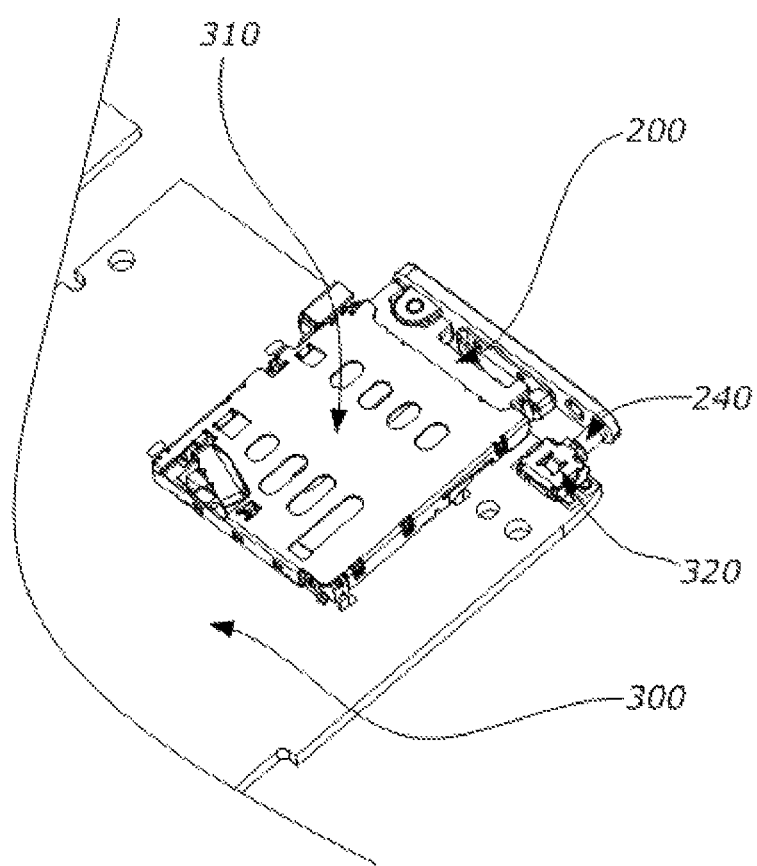
FIG. 7 depicts a partial view of a mobile terminal according to an embodiment of the present invention.

Based on the above, a SIM card holder having a button structure may be incorporated into a mobile terminal, as shown in FIG. 7. Turning to FIG. 7, a partial view of a mobile terminal may include a mobile terminal body 300 (only a mainboard of the mobile terminal is shown in FIG. 7), a SIM connector 310 and a button switch 320 inside the mobile terminal body 300. The SIM card holder having a button structure 200 may be provided on the mobile terminal body 300. The SIM card holder having a button structure 200 may be assembled inside the SIM connector with the button switch 240 in contact connection with the button contact 320.

Furthermore, a shell of the mobile terminal body 300 may include a through hole (not shown in FIG. 7) for the button contact 240 to extend through. One end of the through hole may, for example, correspond to a position of the button contact 240. Another end of the through hole may correspond to a position of the button switch 320, the button contact 240 may extend through the through hole to directly reach the position of the button switch 320, and an external force may be applied to press the button contact 240. Thereby, switch control on the button switch 320 may be achieved.

Principle and operating steps of the mobile terminal and the SIM cardholder having a button structure may include inserting the tray 210 into the SIM connector 310, and fix the tray 210 with the SIM connector 310 and pressing an end of the cover 220 that is provided with the button contact 240. In response, the cover 220 may rotate inward around the rotation shaft 231 and may trigger the button switch 320 through the button contact 240. When the button contact 240 triggers the button switch 320, the cover 220 may rotate outward around the rotation shaft 231 to reset the cover 220 through the V-shaped spring sheet 250. When the tray 210 and the SIM connector 310 are fixed, the cover 220 can rotate around the rotation shaft 231, thereby achieving functions of the buttons. While during the triggering process of the button contact 240 and the resetting process of the cover 220, the limiting hook 251a, the protrusion 210a and the second opening groove 212 can limit the rotation range of the cover 220, as described above.

In summary, a mobile terminal and a SIM card holder having a button structure are provided. The SIM card holder and the button may be combined. The combination may reduce one side button part for the mobile terminal, which may allow an associated mobile terminal to be light and thin, which may save cost. Since one button is removed, an external design of the product may be simplified such that an appearance of the product may be simpler and more beautiful.

It should be understood that applications of the present invention are not limited to the above examples. To those skilled in the art, improvements or modifications may be made according to the above description, and all of these improvements or modifications shall be encompassed by the scope of the appended claims.

The invention claimed is:

1. A SIM card holder having a button structure, comprising:
   a tray and a cover, wherein one end of the cover is rotatably connected to the tray by a rotation shaft structure, and the other end of the cover is provided with a button contact,
   wherein the rotation shaft structure includes a rotation shaft fixedly mounted on the tray;
   a rotation shaft seat fixedly mounted on the cover, wherein the rotation shaft is assembled onto the rotation shaft seat; and
   a V-shaped spring sheet between the cover and the tray, wherein the V-shaped spring sheet includes an installation portion fixedly installed on an internal side of the cover and a spring portion abutting against an external side of the tray.

2. The SIM card holder having a button structure according to claim 1, wherein the external side of the tray is formed with a first opening groove, the spring portion is disposed inside the first opening groove, and an end of the spring portion abuts against a bottom of the first opening groove.

3. The SIM card holder having a button structure according to claim 1, wherein an end of the installation portion bends inward to form a limiting hook, a protrusion is formed on the tray, and the protrusion and the limiting hook lock with each other.

4. The SIM card holder having a button structure according to claim 3, wherein an internal side of the protrusion is formed with a second opening groove, and the limiting hook is disposed within the second opening groove.

5. The SIM card holder having a button structure according to claim 3, wherein the end of the installation portion forms a guide groove through symmetric guide edges, and the protrusion is disposed within the guide groove.

6. A SIM card holder having a button structure, comprising:
   a tray and a cover, wherein one end of the cover is rotatably connected to the tray by a rotation shaft structure, and another end of the cover is provided with a button contact, and
   a spring sheet between the cover and the tray, wherein the spring sheet includes an installation portion fixedly installed on an internal side of the cover and a spring portion abutting against an external side of the tray.

7. The SIM card holder having a button structure according to claim 6, wherein the rotation shaft structure includes a rotation shaft fixedly mounted on the tray, and a rotation shaft seat fixedly mounted on the cover, the rotation shaft is assembled onto the rotation shaft seat.

8. The SIM card holder having a button structure according to claim 6, wherein the spring sheet is formed from a V-shaped spring sheet.

9. The SIM card holder having a button structure according to claim 8, wherein the external side of the tray is formed with a first opening groove, the spring portion is disposed inside the first opening groove, and an end of the spring portion abuts against a bottom of the first opening groove.

10. The SIM card holder having a button structure according to claim 8, wherein an end of the installation portion bends inward to form a limiting hook, a protrusion is formed on the tray, and the protrusion and the limiting hook lock with each other.

11. The SIM card holder having a button structure according to claim 10, wherein an internal side of the protrusion is formed with a second opening groove, and the limiting hook is disposed within the second opening groove.

12. The SIM card holder having a button structure according to claim 10, wherein the end of the installation portion forms a guide groove through symmetric guide edges, and the protrusion is disposed within the guide groove.

13. A mobile terminal, comprising:
    a mobile terminal body, a button switch inside the mobile terminal body; and
    a SIM card holder including a tray and a cover, one end of the cover being rotatably connected to the tray by a rotation shaft structure, another end of the cover including a button contact,
    wherein the button switch is in contact connection with the button contact via a through hole, which the through hole includes endpoints corresponding to positions of the button contact and the button switch; and
    a V-shaped spring sheet between the cover and the tray, wherein the V-shaped spring sheet includes an installation portion fixedly installed on an internal side of the cover and a spring portion abutting against an external side of the tray.

14. The mobile terminal according to claim 13, wherein the rotation shaft structure includes a rotation shaft fixedly mounted on the tray, and a rotation shaft seat fixedly mounted on the cover, the rotation shaft is assembled onto the rotation shaft seat.

15. The mobile terminal according to claim 13, wherein the external side of the tray is formed with a first opening groove, the spring portion is disposed inside the first opening groove, and an end of the spring portion abuts against a bottom of the first opening groove.

16. The mobile terminal according to claim 13, wherein an end of the installation portion bends inward to form a limiting hook, a protrusion is formed on the tray, and the protrusion and the limiting hook lock with each other.

17. The mobile terminal according to claim 16, wherein an internal side of the protrusion is formed with a second opening groove, and the limiting hook is disposed within the second opening groove.

18. The mobile terminal according to claim 16, wherein the end of the installation portion forms a guide groove through symmetric guide edges, and the protrusion is disposed within the guide groove.

\* \* \* \* \*